(12) United States Patent
Griffin et al.

(10) Patent No.: US 6,194,790 B1
(45) Date of Patent: Feb. 27, 2001

(54) SOLAR SAIL FOR POWER GENERATION

(75) Inventors: Steven Griffin, Albuquerque; Steven Huybrechts, Sandia Park; Troy Meink, Albuquerque; Alok Das, Albuquerque; Kitt Reinhardt, Albuquerque, all of NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/444,984

(22) Filed: Nov. 22, 1999

(51) Int. Cl.$^7$ ........................................... B64G 1/00
(52) U.S. Cl. ..................... 290/1 R; 244/168; 244/173; 322/2 R
(58) Field of Search .................. 290/1 R, 55; 322/2; 244/168, 173

(56) References Cited

U.S. PATENT DOCUMENTS

| | | | |
|---|---|---|---|
| 3,781,647 | * 12/1973 | Glaser | 322/2 |
| 4,078,747 | * 3/1978 | Minovitch | 244/159 |
| 4,553,037 | * 11/1985 | Veazey | 290/55 |
| 4,614,319 | * 9/1986 | Drexler | 244/172 |
| 5,131,341 | * 7/1992 | Newman | 114/39.1 |
| 5,183,225 | * 2/1993 | Forward | 244/168 |
| 5,305,971 | * 4/1994 | Decanini | 244/168 |
| 5,312,073 | * 5/1994 | Flament et al. | 244/168 |
| 5,626,315 | * 5/1997 | Flament et al. | 244/168 |
| 5,697,582 | * 12/1997 | Surauer et al. | 244/168 |

\* cited by examiner

*Primary Examiner*—Nicholas Ponomarenko
(74) *Attorney, Agent, or Firm*—Kenneth E. Callahan (57) ABSTRACT

The space-based solar power generating system is comprised of a flexible thin film photovoltaic sheet supported as a sail in the solar wind. The solar wind provides pointing support, deployment support, and structure stiffness without a heavy backup structure. A high Isp electric propulsion system is used to counteract the force exerted on the sail by the solar wind.

9 Claims, 8 Drawing Sheets

SOLAR SAIL FOR POWER GENERATION

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention is in the field of solar power generation for spacecraft, and in particular relates a photovoltaic blanket of flexible thin film photovoltaics supported in a sail configuration that is stiffened and oriented by the solar wind.

2. Description of the Prior Art

Modern spacecraft are starved for power. For example, a global positioning spacecraft typically requires less power to operate than a standard household hairdryer (about 1.2 kW). Standard solar array designs, which have worked extremely well for decades, are reaching the limit of their capacity to increase the available power to the spacecraft. At the same time, spacecraft are demanding more and more power. For many spacecraft systems, a spacecraft's capability is directly proportional to the amount of power available.

While photovoltaics technology has changed dramatically, standard solar array design has not. Rigid photovoltaics technology has increased in efficiency from less than 10% to, in the near future, greater than 34%. The use of solar concentrators has recently been demonstrated in conjunction with this technology and, possibly, thermal to electric conversion. Probably of most importance, thin film flexible photovoltaics have been developed in workable efficiencies leading to the ability to produce power generation "blankets".

These technical advances place us in a unique position to revisit power generation, storage, and management from a wholly new perspective. The power needs of the future are well understood, but what systems will provide that power are completely unknown. All that is known about these systems is that they will not look anything like current-day systems. There is a tremendous potential to take these revolutionary technical advances in the power area and use them to redefine how spacecraft generate and use power.

The maximum power capacity of current state-of-the-art spacecraft power generation systems is approximately 15 kW. The best performing of these systems typically have a specific energy of 80 W/kg and a cost in the range of $1000/W. The goal of this invention is to develop a new structural concept that, using advances in thin film flexible photovoltaics technology, achieves an order of magnitude improvement in these metrics. The present invention has the potential for generating 100 kW of power, with a specific energy of over 1000 W/kg at a cost of less than $100/W. This is accomplished through a large solar power "sail" that uses the solar wind to provide structure stiffness and pointing.

SUMMARY OF THE INVENTION

This invention brings together the solar sail technology with thin film flexible photovoltaics to produce a revolutionary method for power generation. The Solar Sail for Power Generation array concept (hereafter referred to as the "Power Sail") is a "sail" made of a Flexible Thin Film Photovoltaic Blanket (FTFPV) with minimal support structure. The Power Sail should not be confused with a standard solar sail which is used for propulsion only. The Power Sail uses the solar wind to help deploy the sail and to maintain its shape, eliminating the majority of the structure that would normally be required for a large photovoltaic power generating surface. In addition to providing stiffness to the sail, the solar wind has the added benefit of keeping the sail "turned" into the solar wind (normally with the assistance of an auxiliary device, such as a center-of-mass adjustment device), thereby keeping it pointed in the correct direction.

The Power Sail can be attached to a spacecraft or deployed as a free flyer utilizing the structures and sail technology developed for standard solar sails. The current techniques used in solar sails employs deployable/inflatable skeletal structures that support a thin Kapton film. In the Power Sail concept, the Kapton film is replaced with a FTFPV solar cell blanket. These cells consist of a Kapton substrate with deposited polycrystalline. This configuration allows the FTFPV to be used in a similar fashion as the pure Kapton sail. The Power Sail is pointed utilizing the solar wind assisted by electric propulsion or other devices. The lightweight structure, high efficient FTFPV blanket, and free flyer satellite-array architecture allow for a revolutionary increase in performance and reduction in cost.

DESCRIPTION OF THE PREFERRED EMBODIMENT

Figure 1:
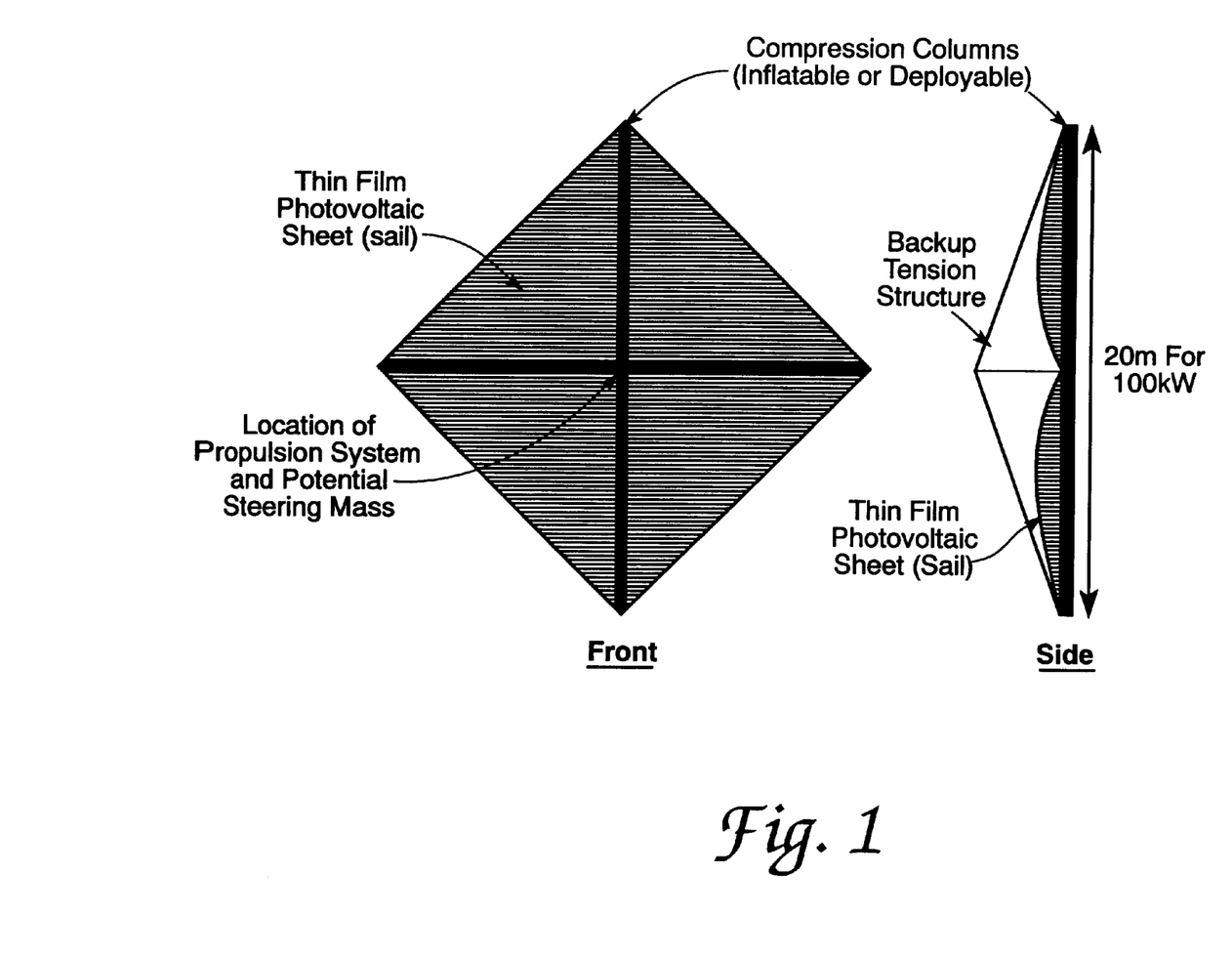
FIG. 1 shows the preferred embodiment mast configuration of the power sail.
Figure 2:
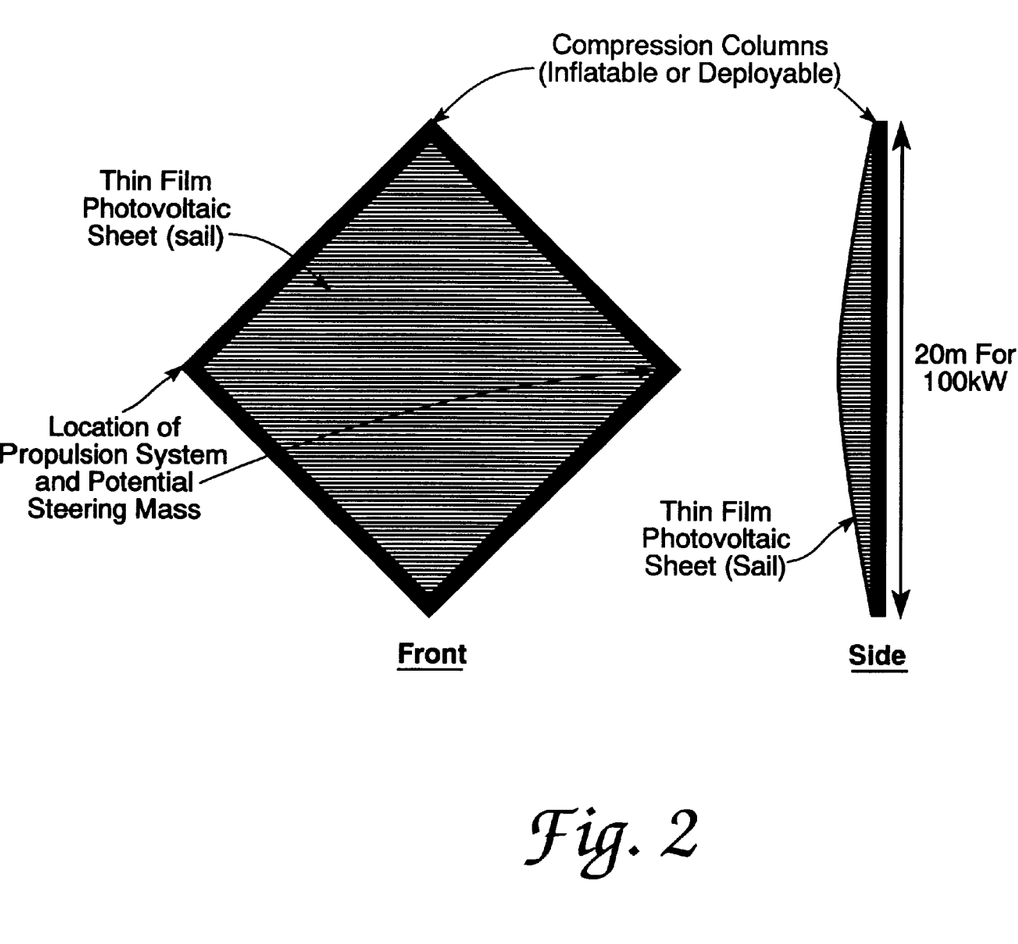
FIG. 2 shows a box configuration of the power sail.
Figure 3:
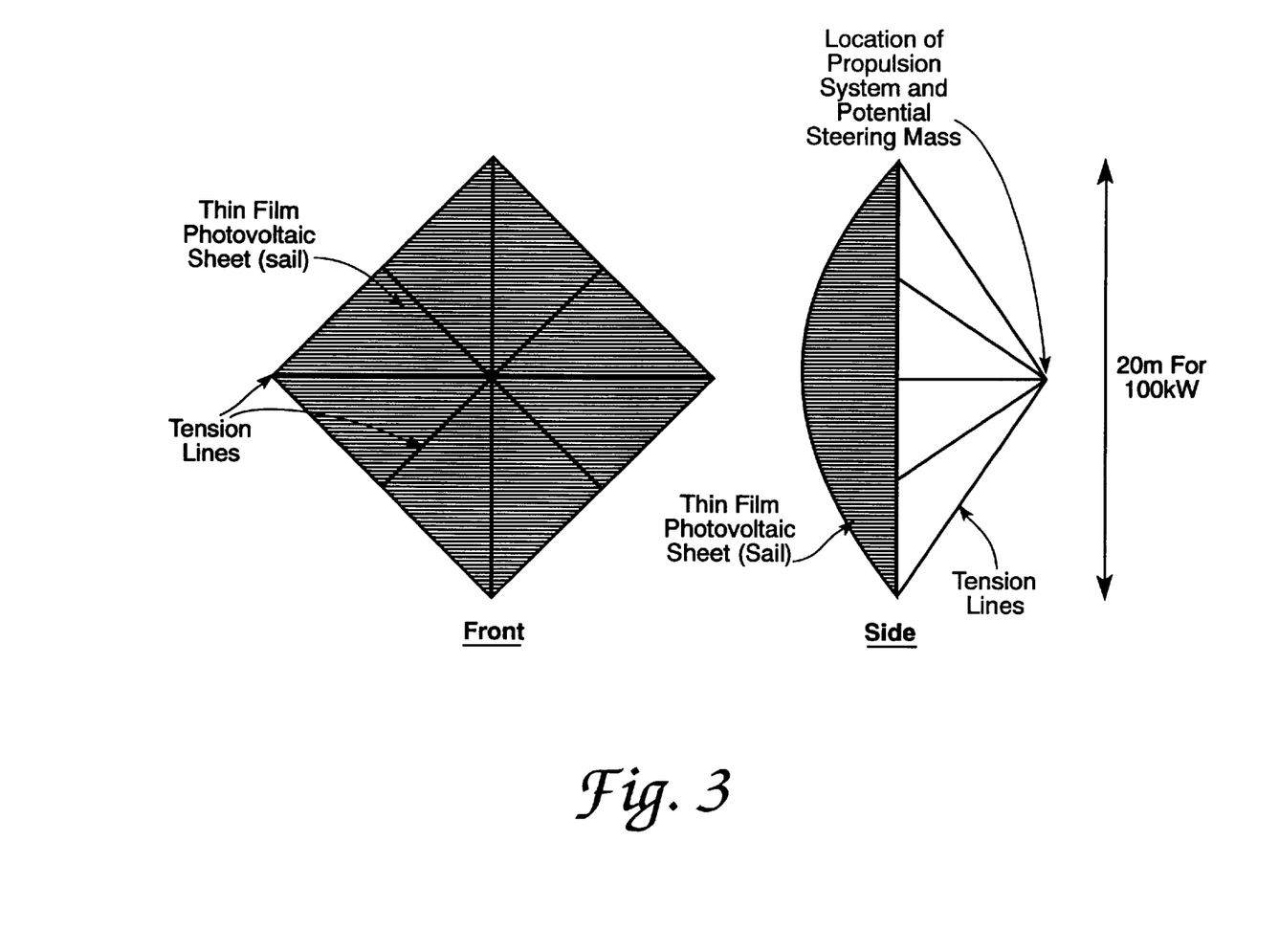
FIG. 3 shows a spinnaker or parachute concept of the power sail.

The Power Sail concept is comprised of three main sections: a sail, a support structure, and an electric propulsion system. The sail is a Flexible Thin Film Photovoltaic (FTFPV) sheet, typically on a Kapton substrate. The sail is designed so that it will inflate in the solar wind, be stiff enough to allow attitude control, and, potentially, "turn" to face the solar wind to keep the proper position. The support structure must allow the sail to deploy and keep the sail from collapsing in the solar wind. Three concepts for this structure are shown in FIGS. 1–3. A cross-member mast structure similar to the JPL solar sail concept is shown in FIG. 1. This is the preferred embodiment. The second configuration is a box beam structure shown in FIG. 2. The third configuration shown in FIG. 3 uses tension cables much like a parachute. One or more small, very high specific impulse (Isp) electric propulsion systems is required in the sail structure to counteract the force exerted by the solar wind. Two electric propulsion systems symmetrically located could be used in certain configurations or a single electric propulsion system centrally located might be used.

Early studies related to using solar sails for propulsion performed at JPL imply that the Power Sail's innovative configuration could result in a support structure mass of less then 0.02 kg/m2, which is 100 times lighter than present day solar array systems. The support structure consists of compression columns that are either inflatable or mechanically deployable. The solar wind is used to "stiffen" the photovoltaic blanket (or sail) alleviating the need for a heavy support structure. The fact that the wind also provides deployment and steering support reduces the weight of the system even more.

The sail can be anchored to the spacecraft it is supplying power to or be deployed as a free flyer. In the free flying concept, the sail is either tethered to the spacecraft by a power tether or power beams transmit the power produced to one or more other spacecraft. The later of these options could be expanded to a large on-orbit "power farm" beaming power to many on-orbit spacecraft.

Figure 4:
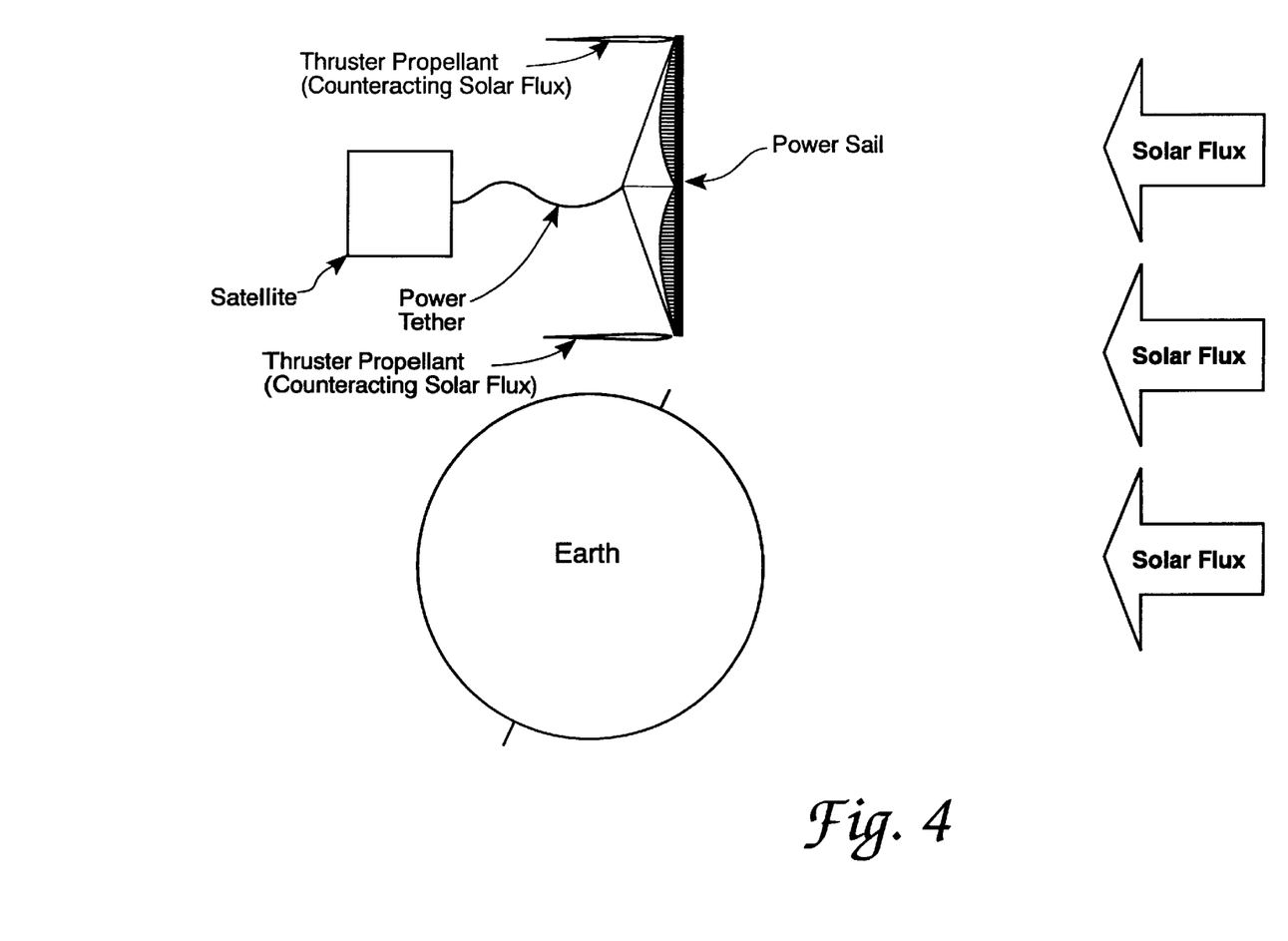
FIG. 4 shows a high inclination on-orbit configuration of the mast power sail tethered to a satellite.
Figure 5:
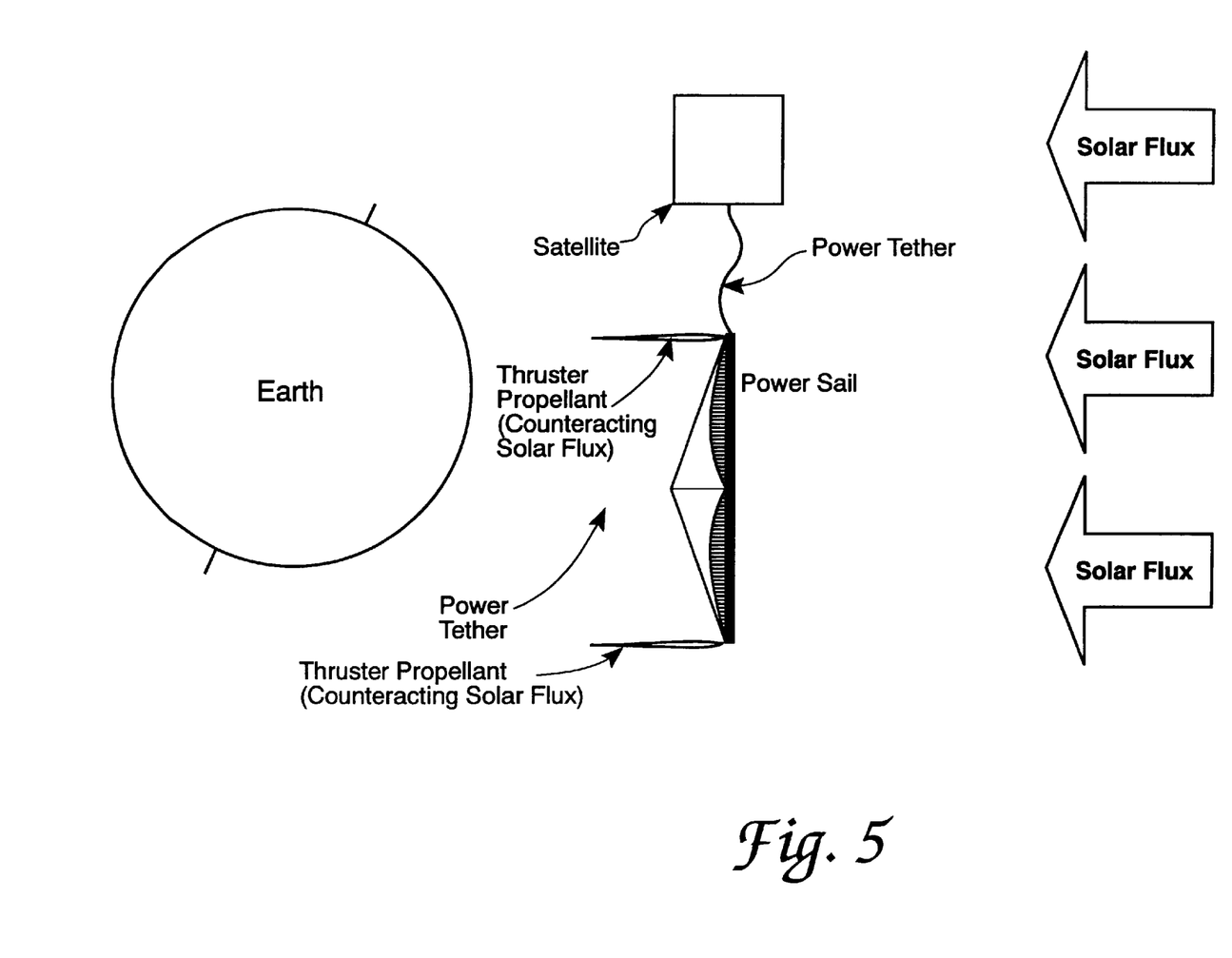
FIG. 5 shows a low inclination on-orbit configuration of the mast power sail tethered to a satellite.
Figure 6:
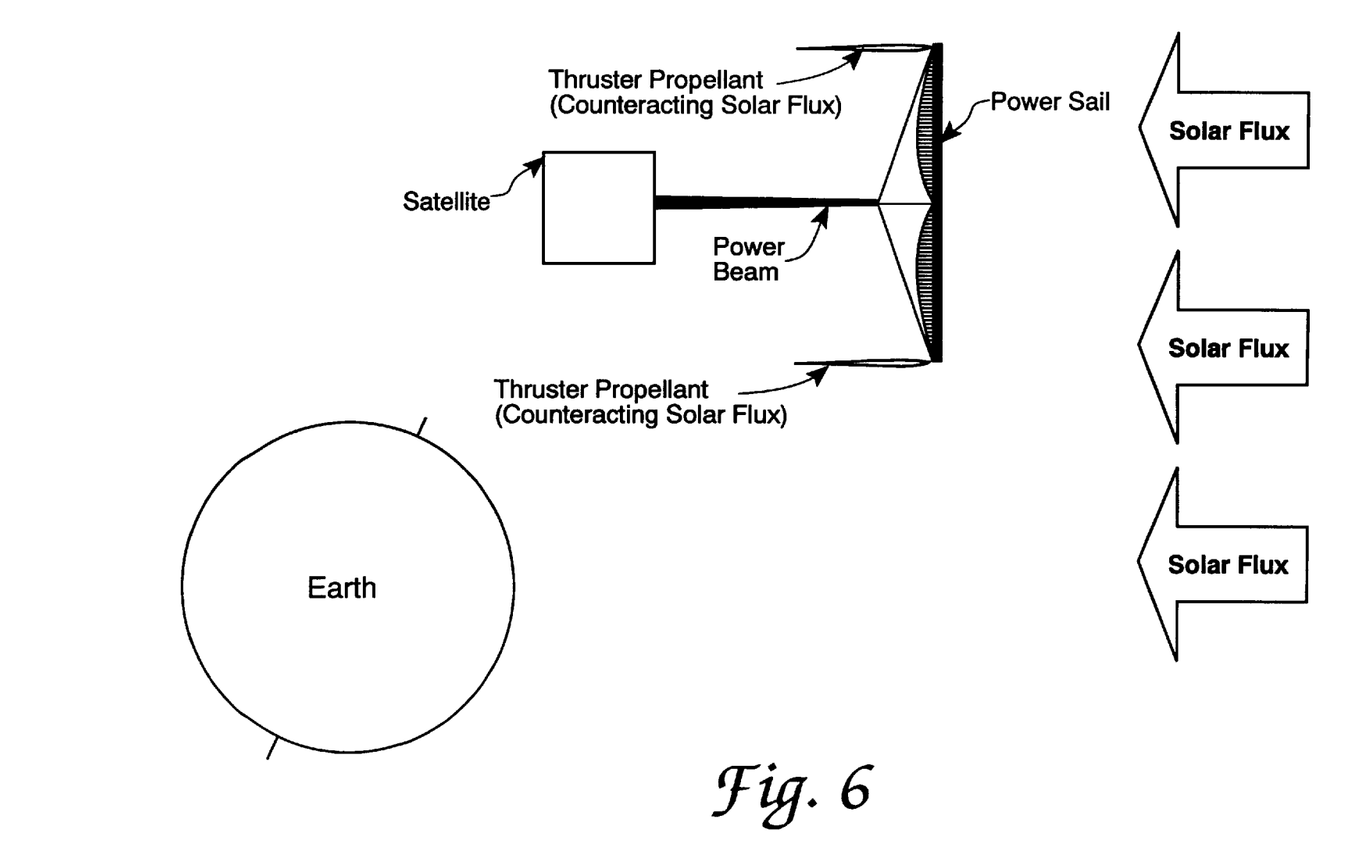
FIG. 6 shows a high inclination on-orbit configuration of the mast power sail with a power beam connection to a satellite.
Figure 7:
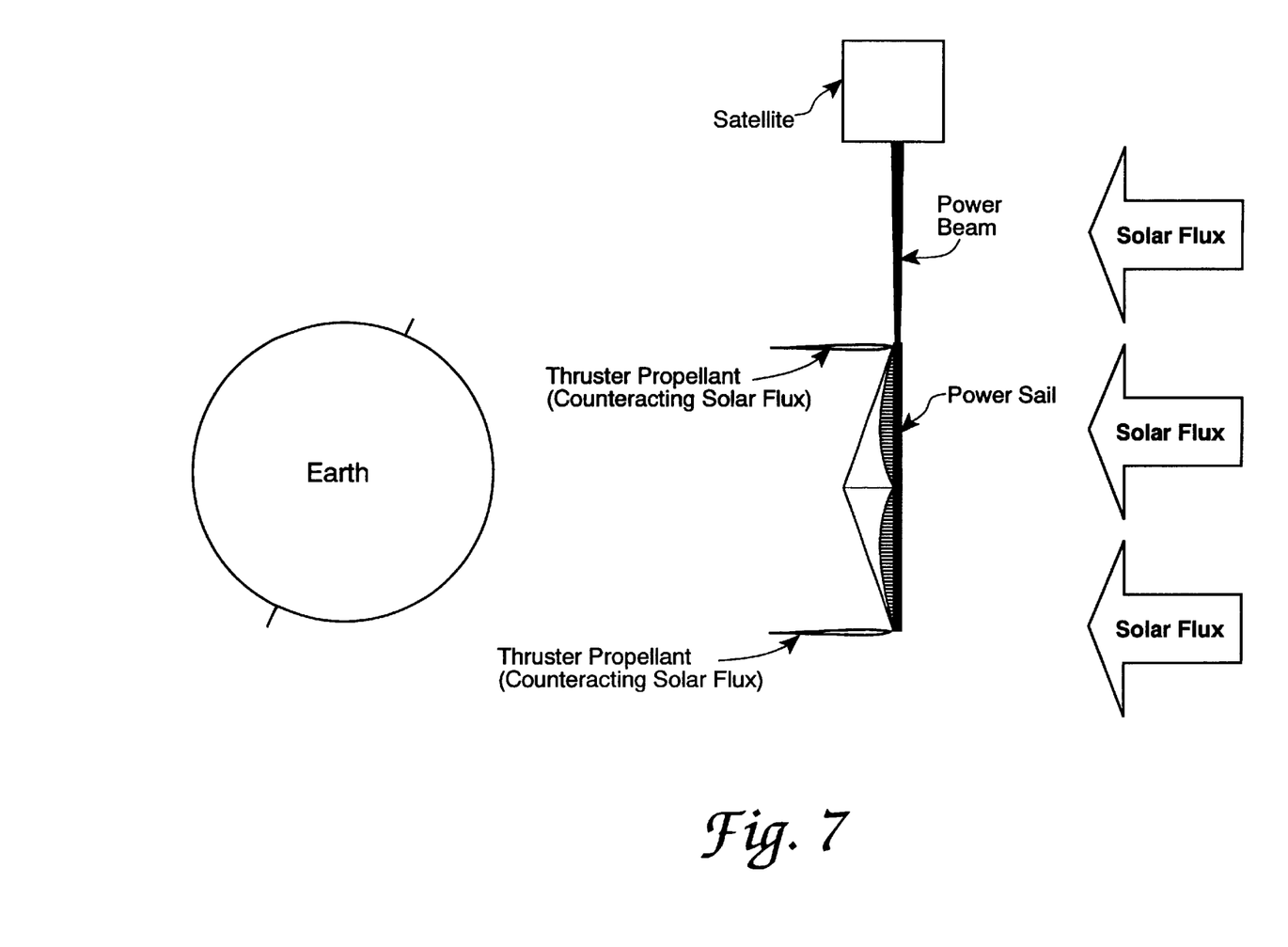
FIG. 7 shows a low inclination on-orbit configuration of the mast power sail with a power beam connection to a satellite.
Figure 8:
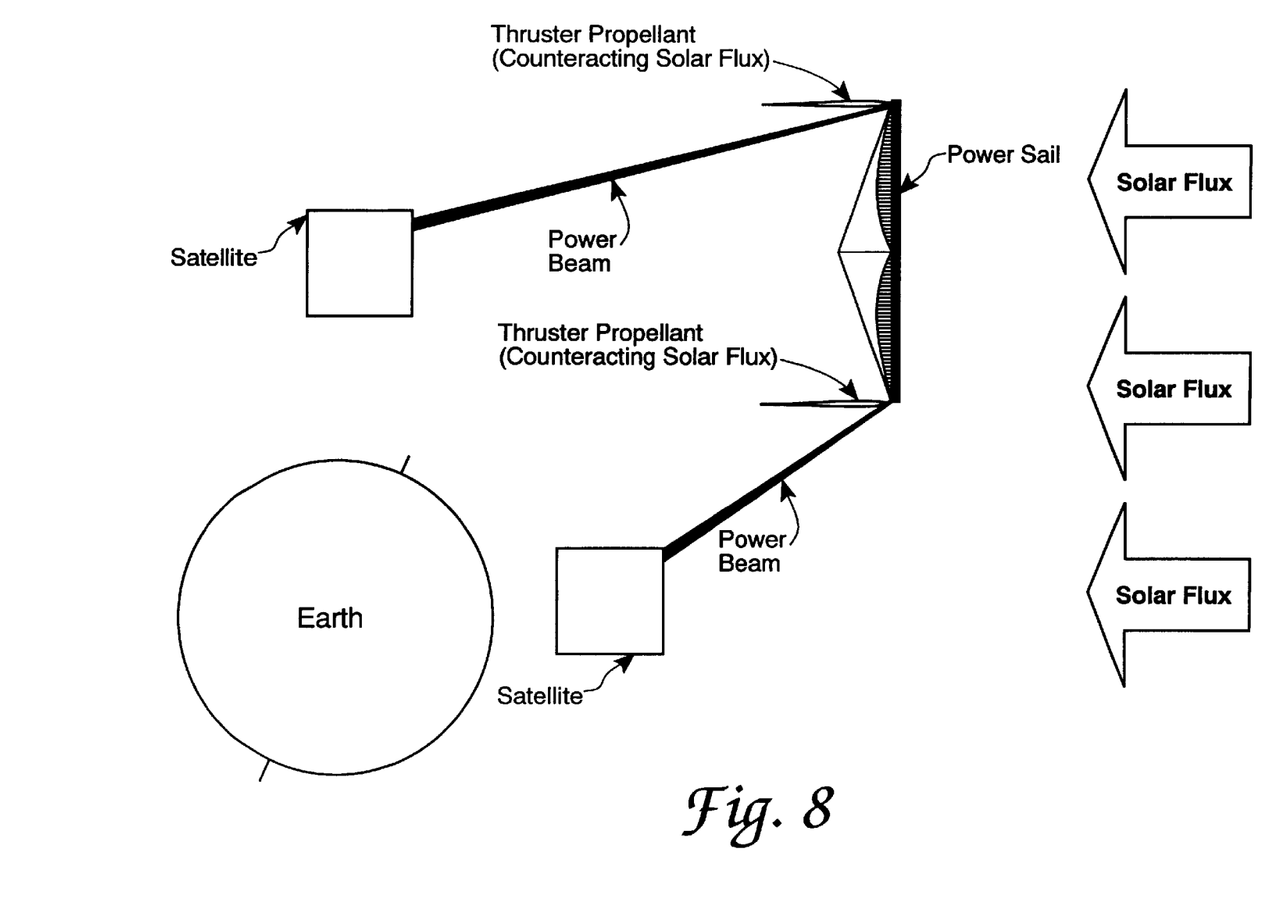
FIG. 8 shows a multiple satellite power beam configuration.

An on-orbit configuration suggested for high-inclination orbits is shown in FIG. 4 This consists of the mast-structure power sail tethered to a satellite. Two small propulsion units are located at opposite corners to counter the force of the solar wind. FIG. 5 shows a similar arrangement for a low-inclination orbit satellite. FIG. 6 is a suggested operational configuration for a mast power sail in a high inclination orbit with a power beam connection to the satellite. FIG. 7 shows a low inclination orbit satellite with a power beam connection to the power sail. FIG. 8 shows a single power sail providing power via a power beam to multiple satellites.

It is also possible to control the orientation of the sail by rerouting electric power through the sail so that the magnetic field generated by the flowing current appropriately interacts with the earth's magnetic field. Orbital maneuvering could also be accomplished by using the Power Sail as a solar propulsion mechanism as studied by JPL.

We claim:

1. A solar sail-based spacecraft power generation system (power sail) comprising:
   a. a power sail material composed of a flexible thin film photovoltaic sheet attached to a flexible substrate;
   b. a lightweight power sail support structure means capable of deploying said power sail sheet in space and maintaining said power sail sheet deployed in the solar wind;
   c. means to electrically connect said power sail to a spacecraft; and
   d. a propulsion system means of sufficient thrust to counter the force exerted on said power sail by said solar wind.

2. The power sail of claim 1, wherein the propulsion system means is an electric propulsion system.

3. The power sail of claim 2, wherein the support structure means is a cross-member structure for a square-shaped sail.

4. The power sail of claim 3, wherein the electric propulsion unit is located at the center.

5. The power sail of claim 3, wherein two similar electric propulsion units are located at opposite ends of one of the cross-member structure components.

6. The power sail of claim 2, wherein the support structure means is a box structure.

7. The power sail of claim 2, wherein the support structure means is a tension cable structure.

8. The power sail of claim 2, wherein the electrical connection means is by a flexible power tether.

9. The power sail of claim 2, wherein the electrical connection means is by a power beam transmitted to one or more spacecraft.

* * * * *